(12) United States Patent
Smith (10) Patent No.: US 9,907,437 B2
(45) Date of Patent: Mar. 6, 2018

(54) RAMEKIN DISPENSER

(71) Applicant: Michael George Smith, Columbus, OH (US)

(72) Inventor: Michael George Smith, Columbus, OH (US)

(73) Assignee: Rameking Company LLC, Columbus, OH (US)

( * ) Notice: Subject to any disclaimer, the term of this patent is extended or adjusted under 35 U.S.C. 154(b) by 0 days.

(21) Appl. No.: 15/089,124

(22) Filed: Apr. 1, 2016

(65) Prior Publication Data
US 2017/0049247 A1    Feb. 23, 2017

Related U.S. Application Data

(60) Provisional application No. 62/205,918, filed on Aug. 17, 2015.

(51) Int. Cl.
*B65H 3/00*    (2006.01)
*A47J 47/16*   (2006.01)
*A47F 1/08*    (2006.01)
*A47J 47/01*   (2006.01)

(52) U.S. Cl.
CPC .............. *A47J 47/16* (2013.01); *A47F 1/08* (2013.01); *A47J 47/01* (2013.01)

(58) Field of Classification Search
CPC .............. A47J 47/16; A47J 47/01; A47F 1/08
USPC ............ 221/194, 193, 305; 312/35, 42
See application file for complete search history.

(56) References Cited

U.S. PATENT DOCUMENTS

| | | | |
|---|---|---|---|
| 1,156,140 A | 10/1915 | Hair | |
| 1,576,010 A | 1/1922 | Swartz | |
| 1,627,870 A | 3/1925 | Siedemann | |
| 1,943,214 A * | 1/1934 | Dube | A24F 27/10 206/123 |
| 2,155,191 A * | 4/1939 | Hylton | B65D 83/00 211/59.2 |
| 4,109,980 A * | 8/1978 | Brockman | A47F 1/08 211/59.2 |
| 4,574,981 A | 3/1986 | Jewett | |
| 4,801,045 A * | 1/1989 | Barnhart | A47F 1/08 221/305 |
| 4,955,529 A * | 9/1990 | Barnhart | A47F 1/08 206/315.9 |
| 5,147,119 A | 9/1992 | Harris | |
| 5,368,191 A | 11/1994 | Johnson | |
| 5,425,474 A | 6/1995 | Dalea et al. | |

(Continued)

*Primary Examiner* — Rakesh Kumar
(74) *Attorney, Agent, or Firm* — Calfee, Halter & Griswold LLP (57) ABSTRACT

A ramekin dispenser including a platform that may be attachable to a commercial kitchen refrigerator and a ramekin holder removably attachable to the platform. The platform may include a base that stops ramekins from falling out of the ramekin holder and that facilitates removal of one ramekin at a time from a dispensing slot. The platform may be removably or permanently attachable to the commercial kitchen refrigerator. The ramekin holder may be removably attachable to the platform via a keyhole and pin arrangement. The ramekin holder may have a cylindrical or some other shape, possibly with a slot on one side. The platform and the ramekin holder may be made of plastic, wood, metal, or any other suitable material. Also, similarly configured dispensers for other items.

6 Claims, 14 Drawing Sheets

(56) References Cited

U.S. PATENT DOCUMENTS

| | | | |
|---|---|---|---|
| 5,615,780 A * | 4/1997 | Nimetz | A47B 77/16 |
| | | | 211/120 |
| 5,855,422 A * | 1/1999 | Naef | A47F 1/08 |
| | | | 211/59.2 |
| 5,884,499 A | 3/1999 | Samborn et al. | |
| 6,357,624 B1 | 3/2002 | Brown | |
| 6,595,106 B2 * | 7/2003 | Eugster | A47F 1/085 |
| | | | 221/199 |
| 7,789,391 B2 * | 9/2010 | Boeru | A63F 3/00094 |
| | | | 273/153 R |
| 8,061,557 B1 * | 11/2011 | Torrance | A63B 55/20 |
| | | | 221/155 |
| 2005/0077258 A1 | 4/2005 | Hagen | |
| 2013/0284863 A1 * | 10/2013 | Daniel | A47J 47/16 |
| | | | 248/125.1 |
| 2016/0309963 A1 * | 10/2016 | Fritzinger | A47J 47/16 |
| 2017/0049247 A1 * | 2/2017 | Smith | A47J 47/16 |

\* cited by examiner

RAMEKIN DISPENSER

CROSS REFERENCE TO RELATED APPLICATION

This application claims the benefit of U.S. Provisional Application No. 62/205,918 filed 17 Aug. 2015 with the same title and inventor as this non-provisional application.

BACKGROUND

The present disclosure generally relates to a ramekin dispenser, for example suitable for installation in a commercial kitchen refrigerator.

SUMMARY

The subject technology generally concerns a dispenser for storing and dispensing ramekins, which in the commercial restaurant industry are small bowls that contain special sauces used for cooking or flavoring various dishes. The subject technology may also be applied to soufflé cups and/or other cups or containers that can be used to hold sauces, flavorings, and/or other ingredients. In some aspects, the dispenser is in the shape of a tube with an elongated body within which the ramekins may be stacked and a dispensing slot in a sidewall facing a user. The tube preferably can be adjusted or swapped out so that the size of the dispensing slot can vary with the size or the volume of the ramekin. Ramekins can vary in size from one ounce to six ounces. In use, the lowermost ramekin preferably can be grasped by the user and pulled through the dispensing slot. The size and shape of the dispenser preferably allows for it to be installed inside a commercial kitchen refrigerator. The subject technology also encompasses similarly configured dispensers for other items.

This brief summary has been provided so that the nature of the invention may be understood quickly. Additional steps and/or different steps than those set forth in this summary may be used. A more complete understanding of the invention may be obtained by reference to the following description in connection with the attached drawings.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

U.S. Provisional Application No. 62/205,918 filed 17 Aug. 2015 with the same title and inventor as this non-provisional application is hereby incorporated by reference as if fully set forth herein.

A general non-limiting overview of practicing the subject technology is presented below. The overview outlines exemplary practice of embodiments of the present disclosure, providing a constructive basis for variant and/or alternative and/or divergent embodiments, some of which are subsequently described.

The disclosure generally relates to a device for storing and dispensing ramekins, which in the commercial restaurant industry are small plastic, glass, ceramic, or other types of bowls that contain special sauces used for cooking or flavoring various dishes. The subject technology may also be applied to soufflé cups and/or other cups or containers that can be used to hold sauces, flavorings, and/or other ingredients. The term "ramekin" is primarily used in this disclosure for the sake of readability; however, the disclosure should be understood to encompass possible use of the subject technology with at least some of these other cups and/or containers.

Furthermore, aspects of the subject technology are not limited to use in restaurants. For example, other parts of the hospitality industry such as room service operations may benefit from aspects of the subject technology. The technology may also have applicability to other settings where access to cups and/or holders of materials are involved. One example includes but is not limited to healthcare, for example when certain therapeutic mixtures (e.g., combinations of pills or the like) may be prepared and then stored for later use. Another example includes but is not limited to industrial enterprises, for example when certain mixtures of material may be prepared and the stored for later use. The subject technology may also be applied to dispensing larger items, for example tires. Again, the terms "restaurant" and "kitchen" are primarily used in this disclosure for the sake or readability; however, the disclosure should be understood to encompass possible use of the subject technology in at least some of these and possibly other settings.

In many commercial kitchens, ramekins are prepared in advance and stored in a refrigerator. The ramekins hold special sauces that are used by the chef to prepare a dish (i.e. bordelaise sauce for adding to steak or mushrooms) or by servers to be added to the plate for the use by the customer (i.e. cocktail sauce for shrimp). Most restaurants start with the same basic foodstuffs because few restaurants raise their own chicken or beef or grown their own vegetables. In many restaurants, the special sauces are important as they distinguish their establishment from other restaurants, especially because so many raw foodstuffs (i.e. chicken breasts, hamburger patties, frozen shrimp, etc.) are pre-cut and packaged by national distributors such as Gordon Food Service, Sysco, Sam's Club, etc.

These special sauces are often prepared in advance so that kitchen efficiency is maximized. For example, a chef often does not have time to prepare four ounces of hollandaise sauce for each individual order. Instead, the chef or other kitchen workers usually prepare enough sauce for that day's anticipated needs for each sauce that is likely to be used that day.

Four to eight or more different sauces are often used in a commercial kitchen. The most common practice is to place all the sauces on one or more trays and place the trays on shelves in that kitchen's commercial refrigerator(s). During the hectic dinnertime hours, the sauces are individually grabbed and used, which often mixes them up on the trays and destroys the natural sorting that happened when the sauces were made. As a result, a surprisingly large amount of the sauces are often wasted and productivity of the kitchen is often degraded.

The ramekin dispenser according to aspects of the subject technology maintains the sort by allowing more than one dispenser to be installed in each commercial kitchen refrigerator. Most commercial kitchen refrigerators can hold four to six ramekin dispensers, preferably one for each sauce. The ramekin dispenser may be located on the interior and/or exterior of a refrigerator door, a space that is often unused in many commercial kitchen refrigerators. The dispenser may also be located in some other place, for example a cupboard, shelf, door, or wall.

The ramekin dispenser preferably maintains the natural sorting that happens when the sauces are made in volume and poured into individual ramekins. The dispenser preferably helps to maintain a desirable first-in first-out inventory, likely helping to prevent keeping old sauces from day to day. Maintaining the first-in first-out inventory sorting may also reduce the likelihood of food borne illnesses. In addition, the ramekin dispenser preferably is installed inside the door of the refrigerator so that the sauces are kept fresh and are easily located.

In view of the above, it is an object of the subject technology to provide a superior dispenser for ramekins in a commercial kitchen operation. The ramekin dispenser is intended to be simple for restaurant personnel to fill and is intended to assist with sorting and inventory control. Preferably, one result is improved efficiency in the kitchen operation because ramekins should be easily filled, arranged in the dispenser, and then located. The ease of location also preferably results in the refrigerator door(s) being kept open for shorter intervals, which may lead to improved quality of food preservation by slowing harmful bacteria growth. The subject technology is not limited to this object or these benefits.

In some aspects, the ramekin dispenser has an elongated body shaped to contain ramekins right-side up. The elongated body has a longitudinal axis with a vertical orientation and a cross-section greater than the diameter of the ramekins to be dispensed to allow gravity to feed the ramekins downward to the slot where they can be removed. A swiping motion for the removal of the ramekin (instead of a straight removal in the direction of the slotted opening) surprisingly may prevent the next one to be removed from jamming against the one directly above and on top. This placement and shape of the slotted opening is unique and allows for this felicitous swiping method of removal.

The ramekin dispenser preferably has two pieces: an elongated tube that holds the ramekins and a platform that is flat on one side so that it can be affixed to the interior and/or exterior of the refrigerator door. The platform preferably is the part that is adhered to the refrigerator door using adhesive tape or any other suitable method and also contains an extension that forms the bottom of a slotted opening. The tube preferably is removably attached to the platform, for example using a pin and keyhole arrangement. One possible benefit of this two-piece construction is that the tube preferably can be easily removed for cleaning and maintaining sanitary environment for the ramekins.

Another possible benefit of the foregoing arrangement is that the pin and keyhole construction that holds the two pieces together may be designed to allow for multiple positioning of the elongated tube to the platform, thereby preferably allowing for multiple positions to conform to the different sizes of tubes and thus different sizes of ramekins. This arrangement preferably allows one platform dimension to handle ramekins that are one ounce, two ounces, four ounces, or some other size.

One embodiment of the foregoing technology includes a device for storing and dispensing a variety of ramekins attached to the inside of the door of a commercial kitchen refrigerator having a substantially circular closure wall and a platform for adhesion to the refrigerator door. The embodiment includes (a) an elongated body shaped to contain a variety of plastic ramekins in a right-side up relationship forming a vertical stack, the elongated body having a longitudinal axis with a vertical orientation and a cross-section greater than the diameter of the ramekins to be dispensed to allow movement of such ramekins along the longitudinal axis of the elongated body; (b) the elongated body including a horizontal dispensing slot parallel to the flat top of the lids of the ramekins through which the ramekins may be dispensed horizontally; and (c) a second piece that is removable (for reasons of sanitation) and serves as the platform or foundation and anchors the two parts when combined to the door of the commercial kitchen refrigerator. This second piece also contains a rounded floor and lower part of the slot upon which the bottom of the bottom-most and next ramekin to be removed rests. This separation of the two pieces of the slot, when combined with the pin and keyhole method of variable attachment allows for different sizes of ramekins (the diameters of these ramekins are the same but their height is different which allows for the change in volume) to be handled. The shape of the slot facilitates the dispensing of the ramekins from the dispenser in a swiping motion. The subject technology is not limited to this embodiment.

In more detail, a ramekin dispenser according to aspects of the subject technology may include a platform attachable to a commercial kitchen refrigerator and a ramekin holder removably attachable to the platform. The platform may include a base that stops ramekins from falling out of the ramekin holder and that facilitates removal of one ramekin at a time from a dispensing slot. The platform may be removably or permanently attachable to the commercial kitchen refrigerator. The ramekin holder may be removably attachable to the platform via a keyhole and pin arrangement. The ramekin holder may have a cylindrical or some other shape, possibly with a slot on one side. The accompanying figures and following descriptions thereof disclose a ramekin dispenser according to these and other aspects of the subject technology.

Figure 1:
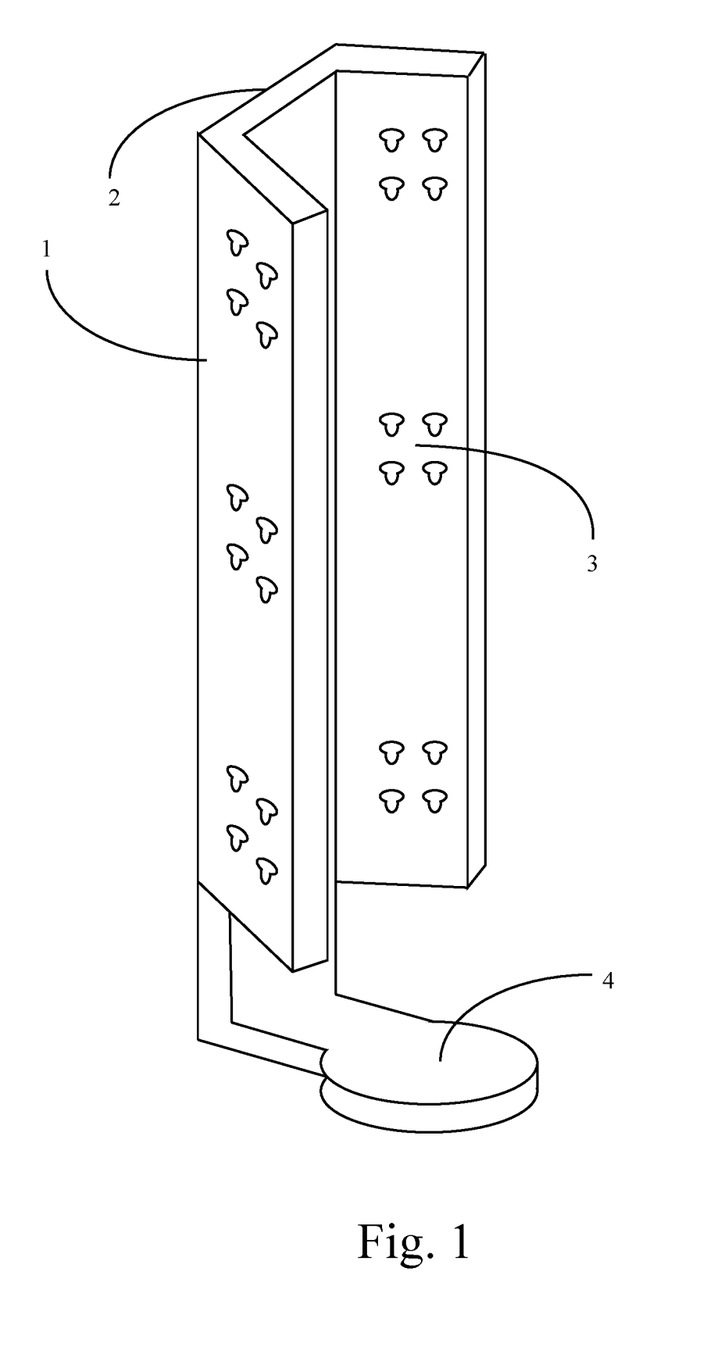
FIG. 1 is a perspective view illustrating aspects of an embodiment of the subject technology.

FIG. 1 is a perspective view illustrating aspects of an embodiment of the subject technology. Platform 1 for a ramekin dispenser preferably includes flat side 2 that may be attached to a surface of a commercial kitchen refrigerator, for example via adhesive tape or some other method. The attachment may be removable or permanent (i.e., not intended to be easily removed). In some aspects, side 2 may be curved to match the curvature of a surface to which it may be attached. Platform 1 also preferably includes keyholes 3 in various arrangements to allow attachment of a ramekin holder via pins, as described below. Other attachment methods also may be used. The platform further preferably includes base 4 that stops ramekins from falling out of the holder and facilitates easy removal of one ramekin at a time.

Figure 2:
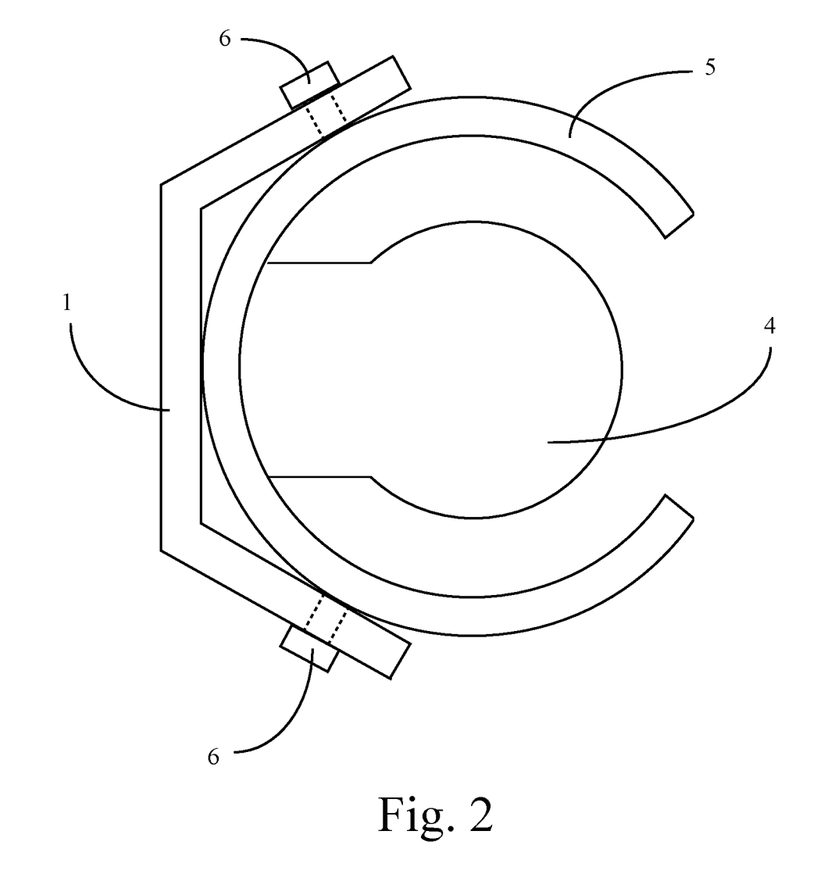
FIG. 2A and FIG. 2B are top views illustrating aspects of an embodiment of the subject technology.
Figure 2A:
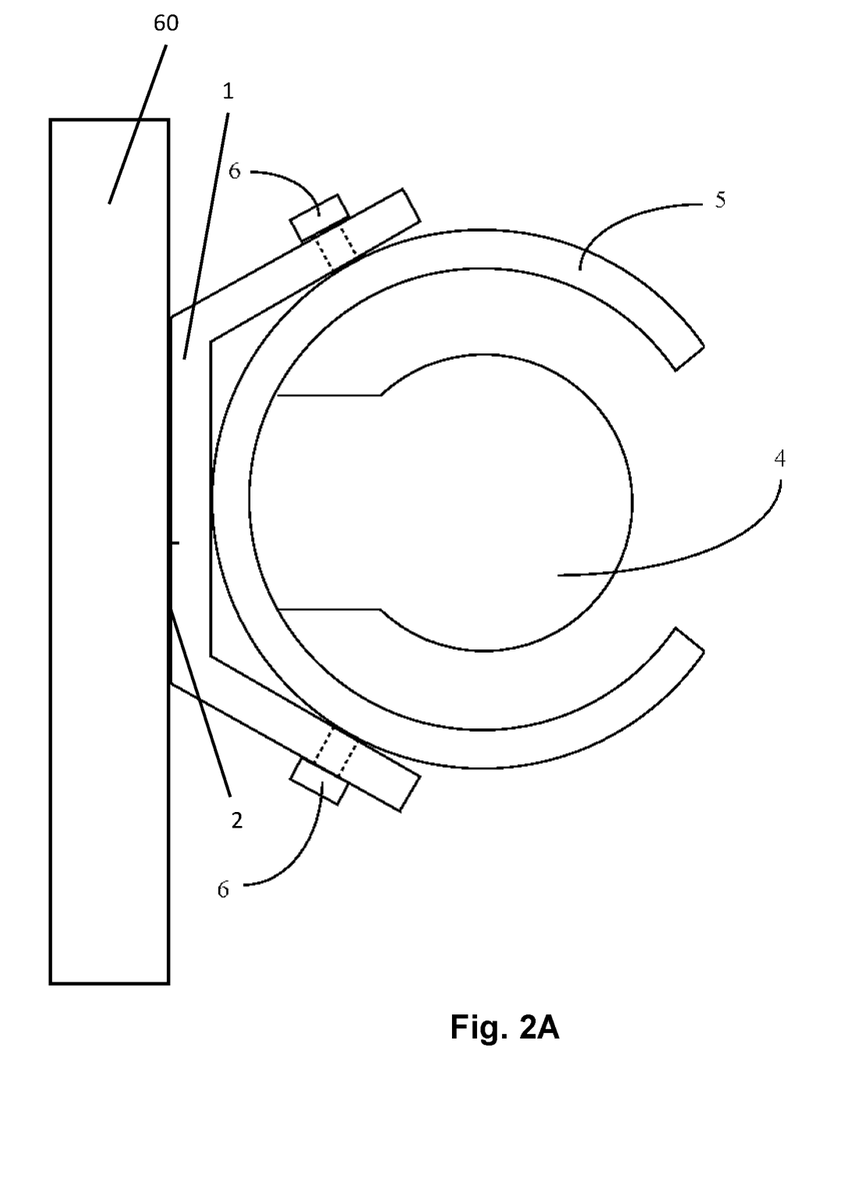
Figure 2B:
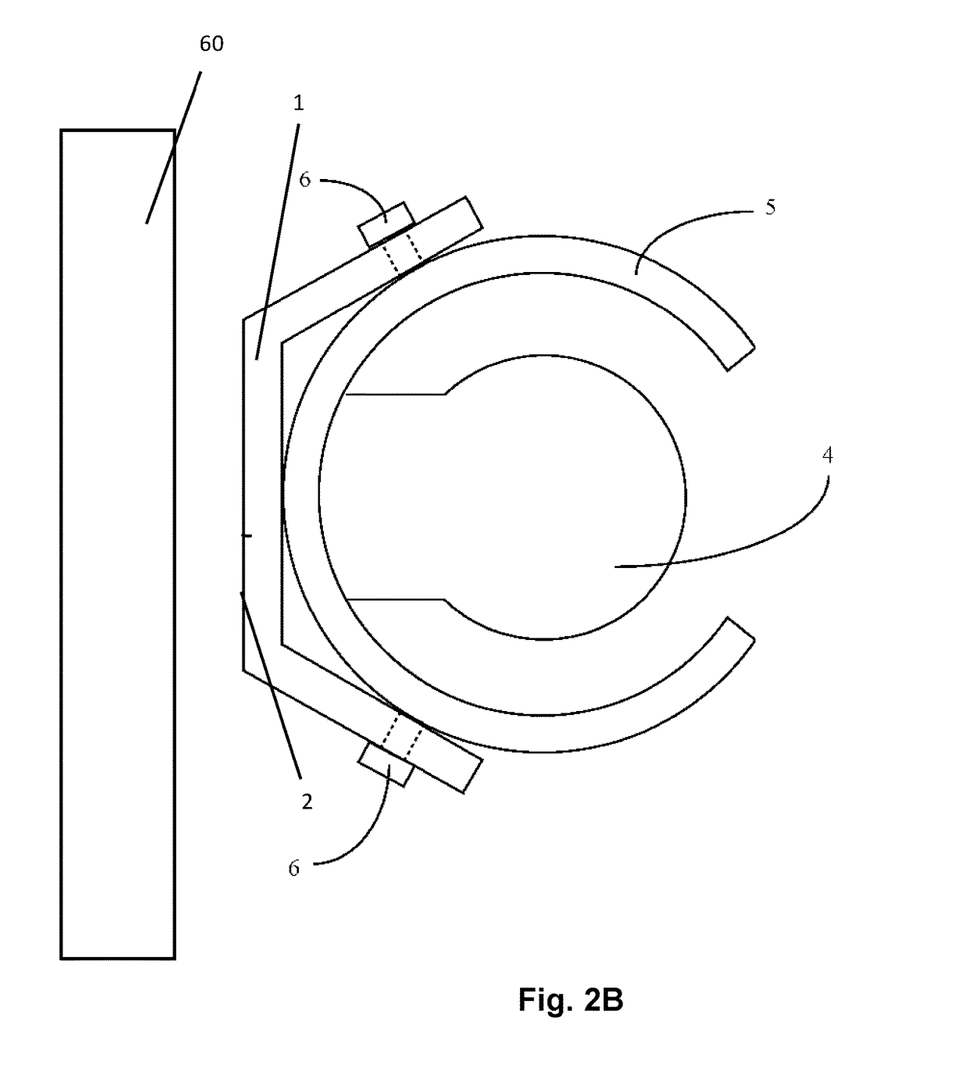

FIG. 2A and FIG. 2B are top views illustrating aspects of an embodiment of the subject technology. This figure shows platform 1 having base 4 along with a ramekin holder in the form of tube 5. The tube is show attached to the platform via pins 6. A portion of a refrigerator wall surface 60 is also illustrated showing the base 4 attached to the wall surface in FIG. 2A and detached in FIG. 2B.

Figure 3:
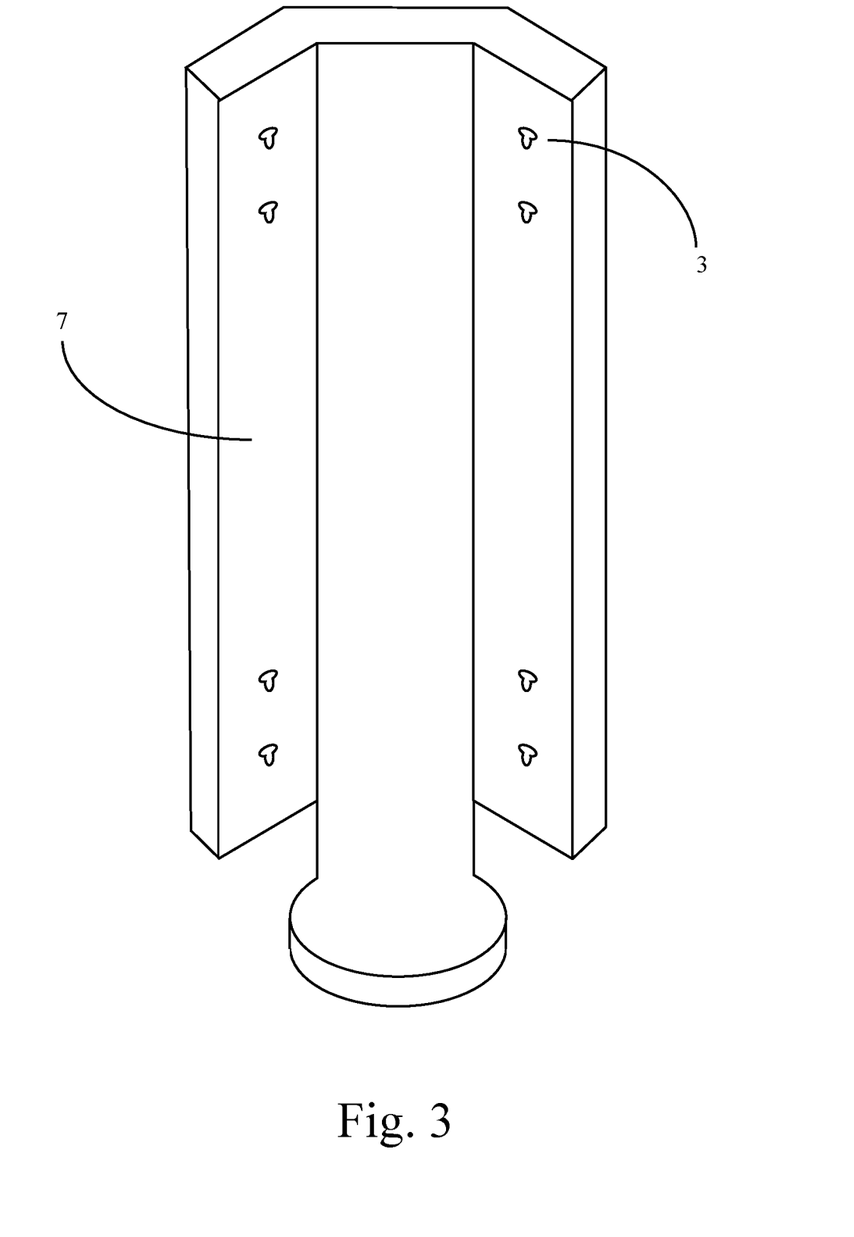
FIG. 3 is a front view illustrating aspects of an embodiment of the subject technology.

FIG. 3 is a front view illustrating aspects of an embodiment of the subject technology. An alternative form 7 of the platform is shown with a different arrangement of keyholes 3. In particular, FIG. 1 shows keyholes at various positions to accommodate different sized ramekin holders. FIG. 3 shows one of many possible alternative spacings of keyholes.

Figure 4:
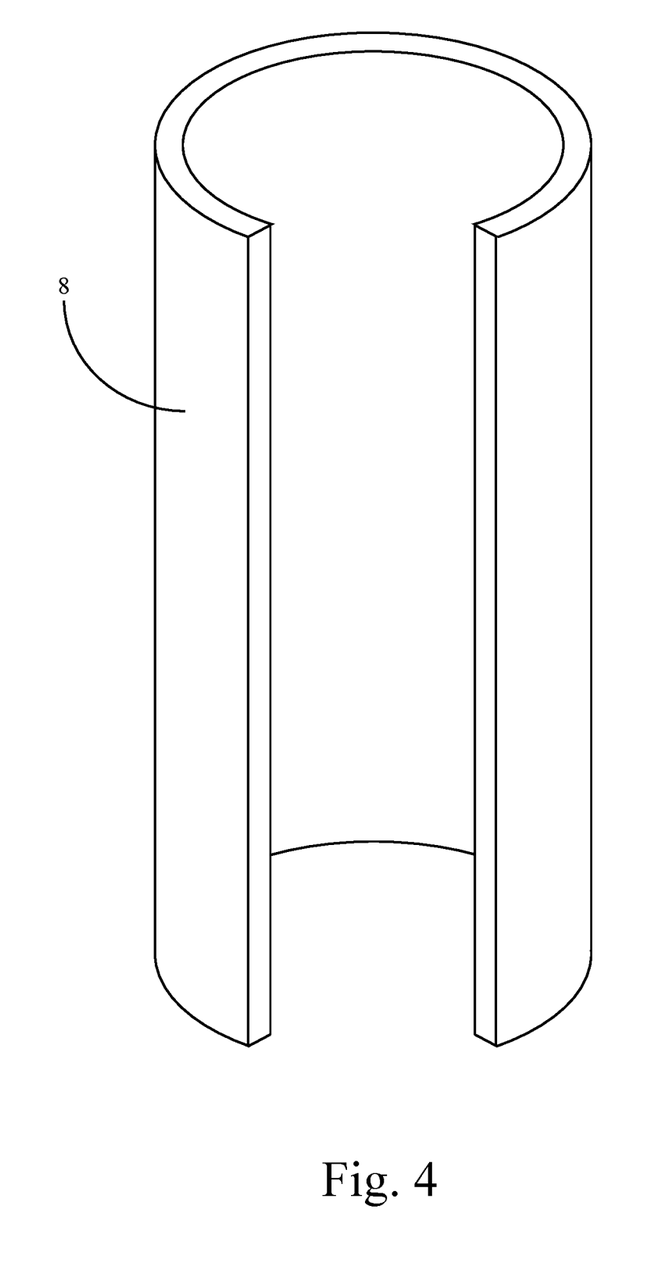
FIG. 4 is another front view illustrating aspects of an embodiment of the subject technology.
Figure 5:
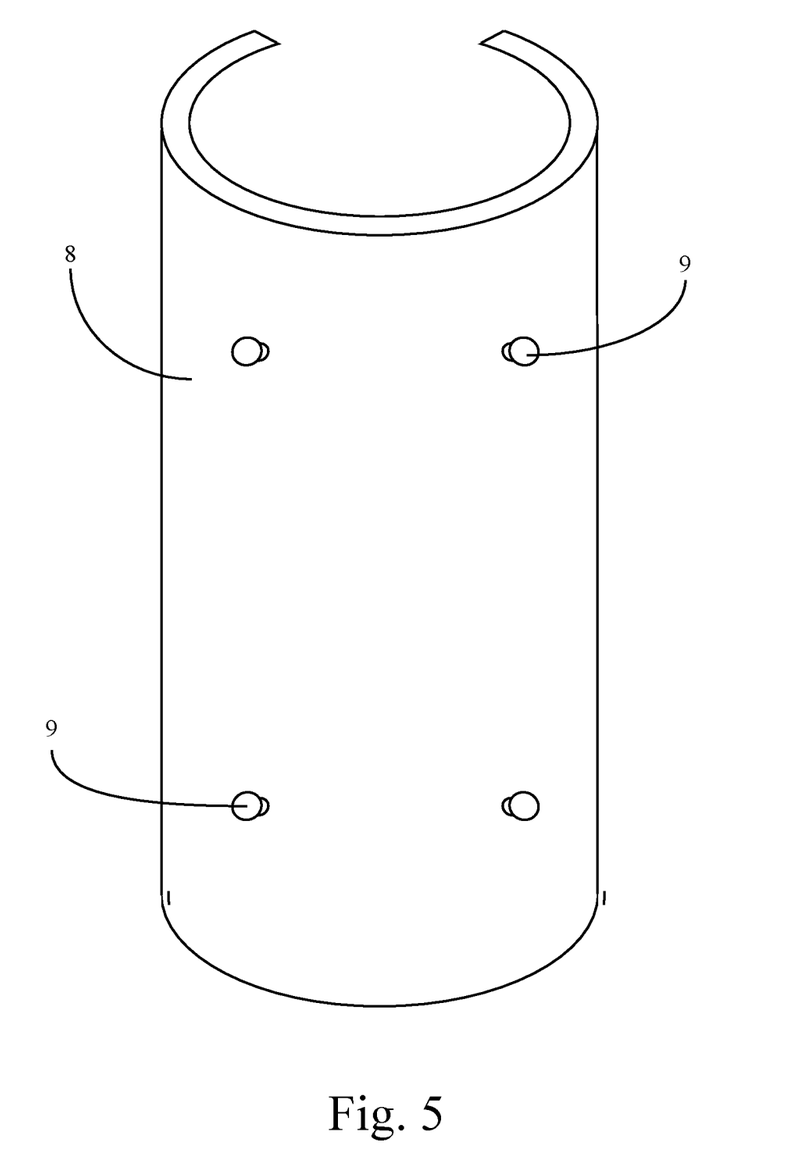
FIG. 5 is a back view illustrating aspects of an embodiment of the subject technology.

FIG. 4 is another front view illustrating aspects of an embodiment of the subject technology. This figure shows tube 8 that may be installed in a platform in order to hold ramekins. The tube in FIG. 4 has a cylindrical shape. FIG. 5 is a back view illustrating aspects of an embodiment of the subject technology. This view shows pins 9 that may be used to attach the tube to a platform such as the one shown in FIGS. 1, 2, and/or 3.

Figure 6:
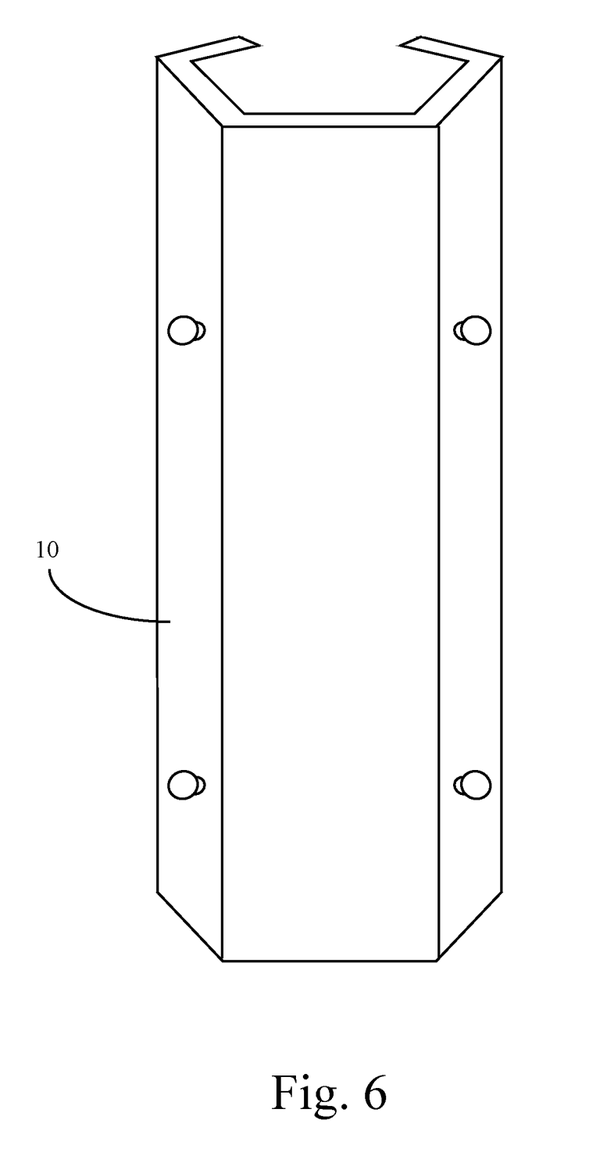
FIG. 6 is another back view illustrating aspects of an embodiment of the subject technology.

FIG. 6 is another back view illustrating aspects of an embodiment of the subject technology. This figure illustrates that the ramekin holder may have a shape 10 that is not cylindrical. Likewise, the platform and/or the platform's base may also have a different shape than shown in the figures.

Figure 7:
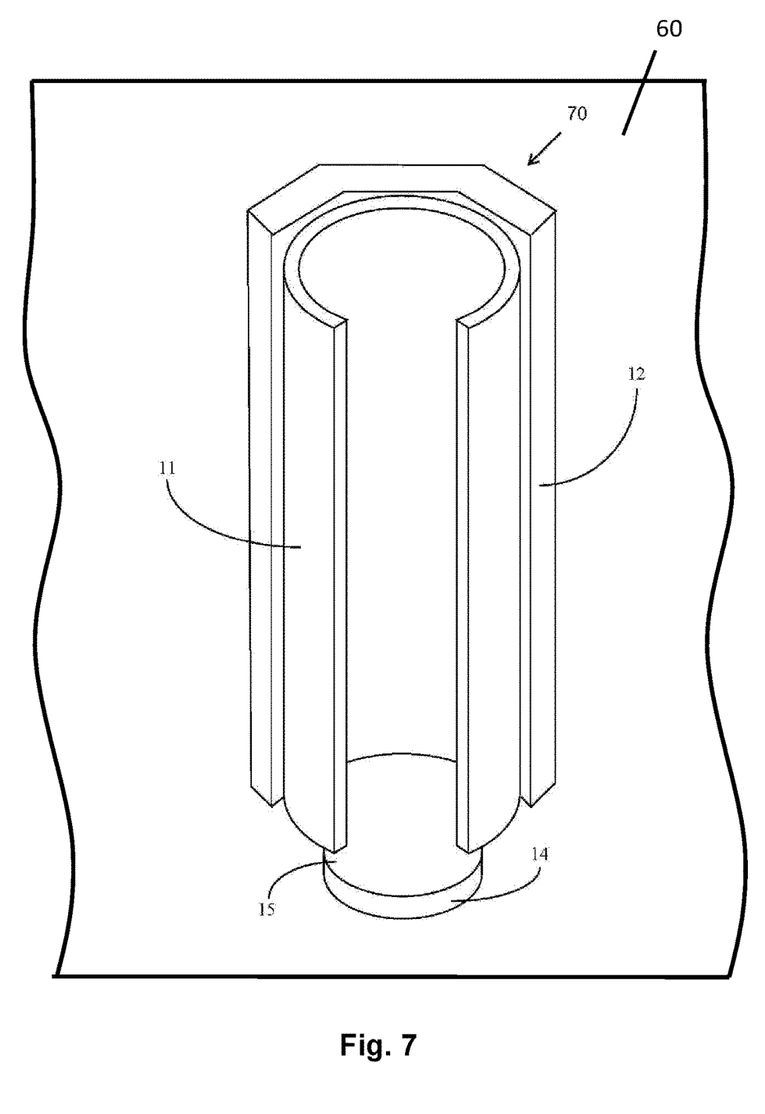
FIG. 7 is another front view illustrating aspects of an embodiment of the subject technology.

FIG. 7 is another front view illustrating aspects of an embodiment of the subject technology. In FIG. 7, ramekin holder 11 is installed in platform 12 with base 14. The ramekin holder 11 preferably is removable, for example by being installed via a pin and keyhole arrangement. The ramekin dispenser 70 shown in the figure preferably permits ramekins stacked in holder 11 to be removed one at a time via dispensing slot 15. Also illustrated is a portion of a refrigerator wall surface 60, to which the ramekin dispenser is attached.

Figure 8:
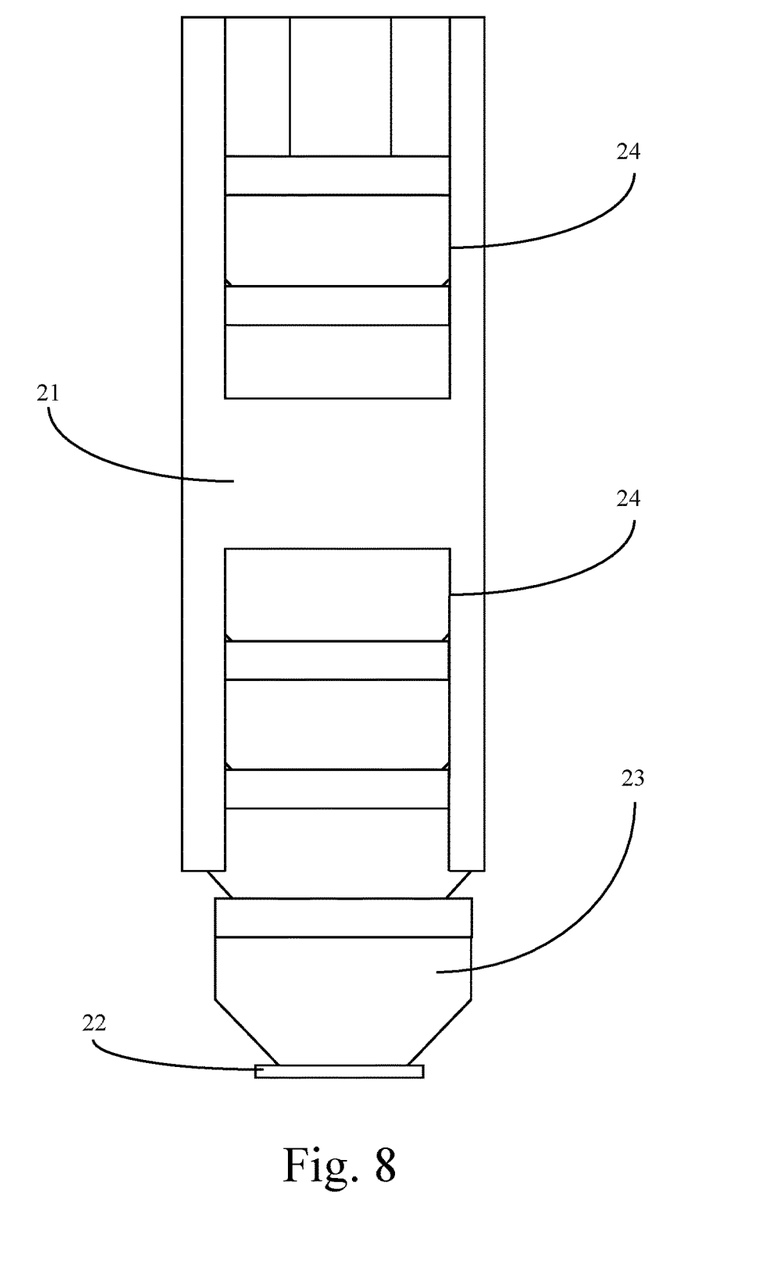
FIGS. 8 and 9 are front views illustrating aspects of another embodiment of the subject technology.
Figure 9:
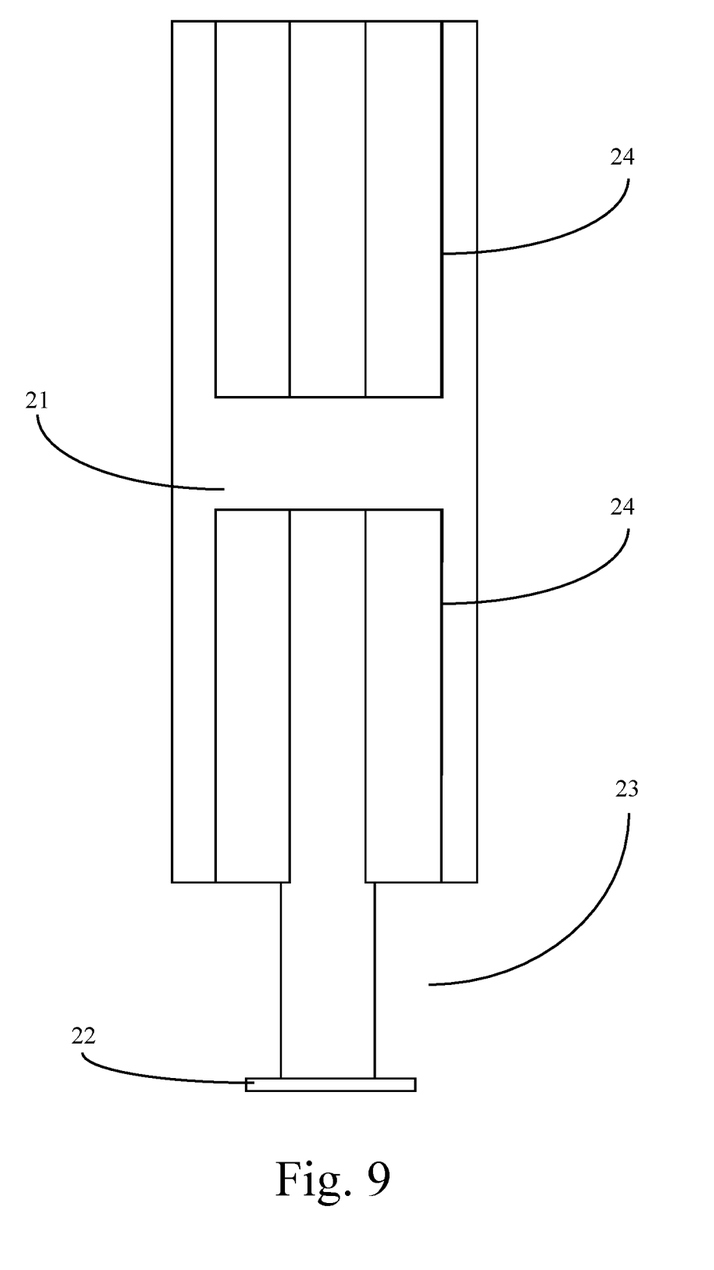
Figure 10:
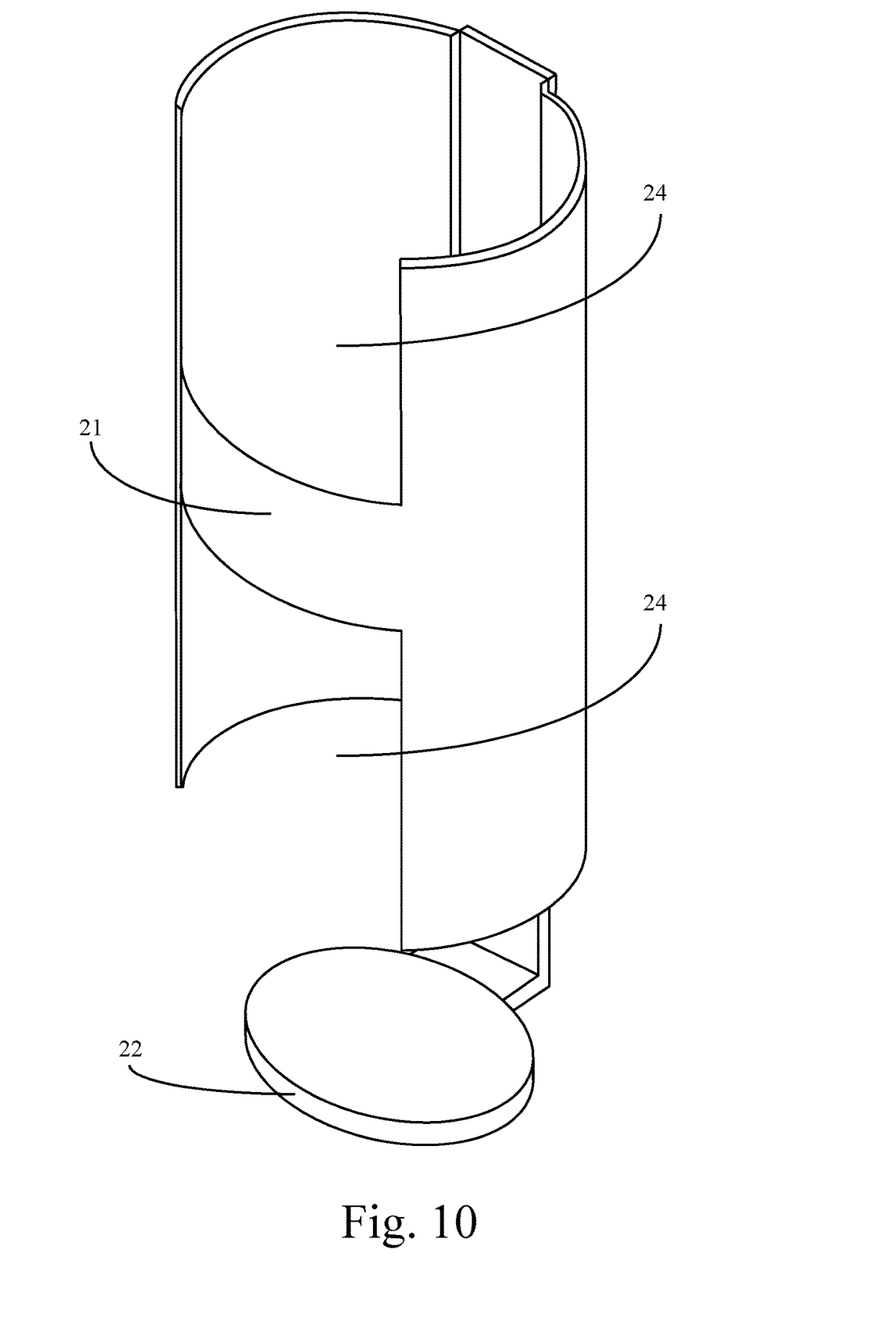
FIG. 10 is a perspective view illustrating aspects of the embodiment shown in FIGS. 8 and 9.

FIGS. 8 and 9 are front views illustrating aspects of another embodiment of the subject technology. FIG. 10 is a perspective view illustrating aspects of the embodiment shown in FIGS. 8 and 9. In these figures, a ramekin dispenser includes ramekin holder 21 installed in a platform with base 22. While the holder shown in FIGS. 8 to 10 is generally cylindrical, other shapes may be used. Ramekins 23 are disposed in the holder. A bottom one of the ramekins preferably is supported by the base and is clear of the holder for easy removal, as shown. Windows 24 allow someone to see how many ramekins are held in the dispenser.

Figure 11:
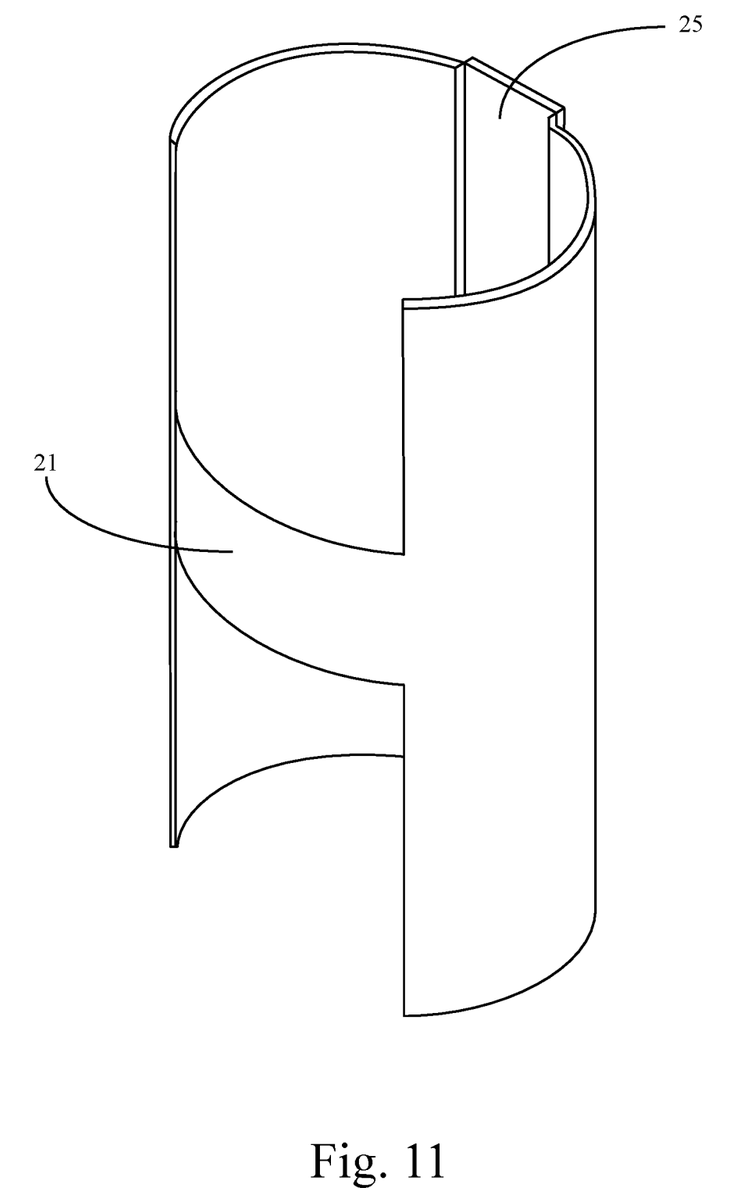
FIGS. 11 and 12 are perspective views illustrating aspects of portions of the embodiment shown in FIG. 10.
Figure 12:
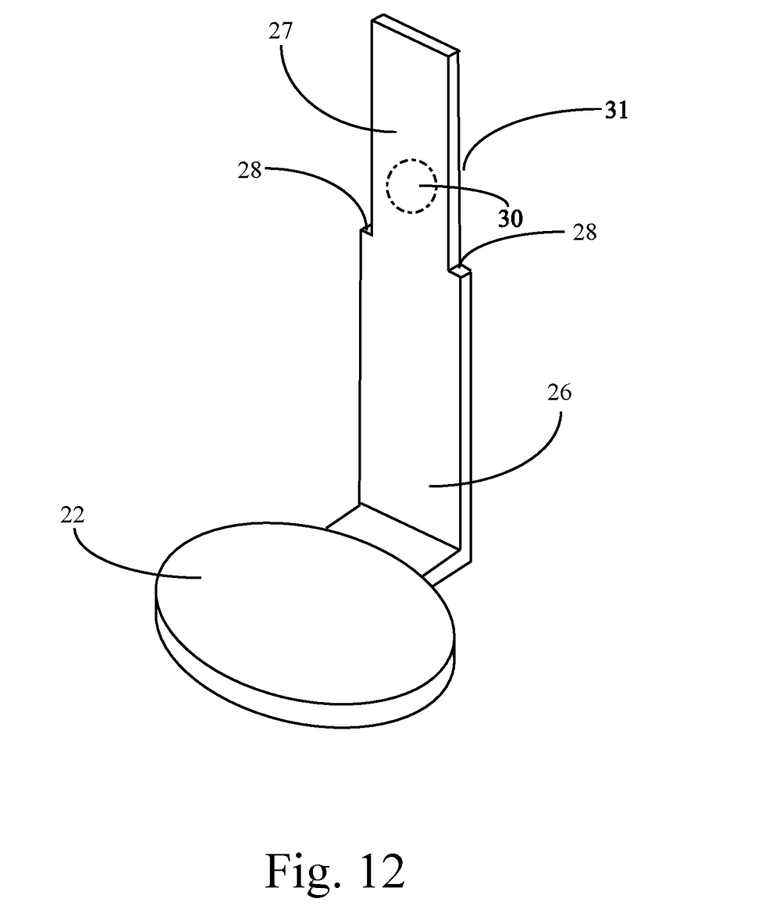

FIGS. 11 and 12 are perspective views illustrating aspects of portions of the embodiment shown in FIG. 10. Holder 21 includes slot 25. Platform 26 with base 22 includes preferably vertical tab 27 with shoulders 28. Platform 26 may be permanently or removably attached, as shown by 30, to a commercial refrigerator or any other surface. In some aspects, the attachment leaves space 31 behind tab 27 to permit holder 21 to slide over the tab. Holder 21 may then be removable attached to platform 26 via slot 25 placed over tab 27. Shoulders 28 may help keep the holder properly positioned via corresponding shoulders in slot 25 (not shown).

The platform and ramekin holder preferably are made of suitably durable and bacteria resistant material(s) such as plastic with anti-bacterial ingredient(s) or coating(s), wood (which can be naturally anti-bacterial), metal, or any other suitable substance(s). The attachment between the platform and tube may also be made of such materials. Other materials and/or forms of attachment may also be used.

While certain embodiments and aspects of the invention have been described, the embodiments and aspects have been presented by way of example only and are not intended to limit the scope of the inventions. Indeed, the novel devices and methods described herein may be embodied in a variety of other forms; furthermore, various omissions, substitutions, and changes in the form of the devices and methods described herein may be made without departing from the spirit of the inventions. For example, the terms "aspect," "example," "preferably," "alternative," and the like denote features that may be preferable but not essential to include in some embodiments of the inventions. Any aspects disclosed with respect to an embodiment of the invention may be applied to other embodiments of the invention. The accompanying claims and their equivalents are intended to cover such forms or modifications as would fall within the scope and spirit of the inventions.

The invention claimed is:

1. An item dispenser for attachment to a substantially vertical surface, the item dispenser comprising:
    a platform configured with a substantially flat side, the substantially flat side adapted for attachment to the vertical surface;
    an item holder removably attachable to the platform, wherein the item holder comprises a plurality of spaced apart pins arranged on a rear surface of the item holder;
    the platform comprising respectively positioned plurality of keyhole slots disposed at different heights on a platform surface, wherein the item holder is attached to the platform via the keyhole and pin arrangement;
    wherein the platform comprises a base configured to prevent an item from falling out of the item holder and that facilitates removal of the item from a dispensing slot; and
    wherein the item holder and platform are configured such that the item holder may be attached in at least two different positions so as to vary the size of the dispensing slot formed between the bottom of the item holder and the base.

2. A dispenser as in claim 1, wherein the platform is removably attachable to the substantially vertical surface.

3. A dispenser as in claim 1, wherein the platform is permanently attachable to the substantially vertical surface.

4. A dispenser as in claim 1, wherein the platform and the item holder are fabricated from materials selected from a group consisting of: plastic, wood, or metal.

5. A dispenser as in claim 1, wherein the item holder comprises a cylindrical shape.

6. A dispenser as in claim 1, wherein the item holder comprises other than a cylindrical shape.

* * * * *